(12) United States Patent
Edgecombe et al.

(10) Patent No.: US 7,811,659 B2
(45) Date of Patent: Oct. 12, 2010

(54) HIGH OPTICAL PURITY COPOLYMER FILM

(75) Inventors: Brian Edgecombe, Moorpark, CA (US); Florence Mehlmann, King of Prussia, PA (US); Ryan Dirkx, Glenmore, PA (US); Manuel Garcia, Yardley, PA (US)

(73) Assignee: Arkema France, Colombes (FR)

( * ) Notice: Subject to any disclaimer, the term of this patent is extended or adjusted under 35 U.S.C. 154(b) by 263 days.

(21) Appl. No.: 11/639,117

(22) Filed: Dec. 14, 2006

(65) Prior Publication Data
US 2007/0178325 A1  Aug. 2, 2007

Related U.S. Application Data

(60) Provisional application No. 60/762,655, filed on Jan. 27, 2006.

(51) Int. Cl.
*B32B 27/30* (2006.01)
*C08L 51/00* (2006.01)
*C08L 53/00* (2006.01)

(52) U.S. Cl. .............. 428/220; 524/504; 524/505; 428/156

(58) Field of Classification Search ............ 524/556
See application file for complete search history.

(56) References Cited

U.S. PATENT DOCUMENTS 6,239,226 B1   5/2001  Fischer et al.
6,822,044 B1  11/2004  Bremser
6,857,708 B2   2/2005  Hartl et al.
2003/0151825 A1  8/2003  Bielawski et al.
2005/0233124 A1  10/2005  Marot et al.
2005/0272865 A1  12/2005  Taniguchi et al.
2006/0063891 A1  3/2006  Ruzette et al.
2008/0050572 A1 * 2/2008  Guerret et al. ............ 428/220

FOREIGN PATENT DOCUMENTS

EP       1475397 A1 * 11/2004
WO   WO 2004/087796    10/2004

OTHER PUBLICATIONS

Machine English Translation of JP-2002/194,167 A.*
Siemann U., Progr Colloid Polym Sci (2005) 130: 1-14.*

* cited by examiner

*Primary Examiner*—David Wu
*Assistant Examiner*—Vu A Nguyen
(74) *Attorney, Agent, or Firm*—Thomas F. Roland

(57) ABSTRACT

The invention relates to a high optical purity toughened copolymer film or coating. The copolymer is a graft or block copolymer, preferably acrylic, preferably produced by a controlled radical polymerization having an extremely low degree of particulate contamination and excellent optical properties. The film or coating is preferably formed by solvent-casting on a temporary substrate or solvent-coating on a permanent substrate.

11 Claims, No Drawings

HIGH OPTICAL PURITY COPOLYMER FILM

This application claims benefit, under U.S.C. §119(e) of U.S. Provisional Application No. 60/762,655 filed Jan. 27, 2006.

FIELD OF THE INVENTION

The invention relates to a high optical purity, toughened film or coating based on copolymers. The copolymers are graft or block copolymers, preferably acrylic, preferably produced by a controlled radical polymerization, having an extremely low degree of particulate contamination. The film or coating is preferably formed by solvent-casting or solvent-coating, and it exhibits excellent optical properties.

BACKGROUND OF THE INVENTION

Acrylic compositions and articles made from them are well known for their clarity, surface gloss, resistance to UV degradation and scratch resistance. They are also known for their low impact strength, brittleness and poor ductility.

Impact strength and ductility can be improved by the addition of impact modifiers to the acrylic matrix, such as core shell impact modifiers described in U.S. Pat. No. 6,420,033. This method can be used to make films or coatings by melt state processing such as melt extrusion of sheet or film, and injection molding. It can also be used to produce films or coatings by solvent-casting or solvent-coating from a dispersed solution. However, core-shell impact modifiers are known to induce optical clarity problems. Their clarity is based on refractive index matching between the additives and the matrix, which depends very much on the temperature. They have poor appearance upon melt processing (such as thermoforming, extrusion, or injection-molding). The poor appearance could be, for instance, high surface haze or lower gloss. Core-shell impact modifiers also create whitening under stress conditions. These effects are especially noticeable when the particle size is similar or larger than the thickness of the films or coatings. Finally, the optical purity of the films or coatings containing core-shell additives cannot be improved through fine filtration, as the impact modifiers will be removed in the filtration step.

A block copolymer impact modifier can also be added to an acrylic resin to improve the impact resistance and toughness. EP 1475397 describes the use of a methacrylate/acrylate block copolymer made by a controlled radical polymerization. The block copolymer can be used as an impact modifier in a thermoplastic matrix, or can be thermoformed itself into a rod, sheet, film or extrusion molded product.

WO 2004/087796 describes the use of block copolymers at a content of at least 95% in an acrylic resin to provide toughness and also to address some of the clarity issues generally related to the use of core-shell additives. The block polymers self-organize at the nanometric scale, which provides excellent transparency of the materials on a large range of temperatures. The block polymer disclosed is processed by melt processing.

U.S. Pat. No. 6,239,226 describes block copolymers formed by n-oxyl radicals and useful in producing transparent or translucent films and moldings having a high impact strength, especially at low temperature. The films are processed by melt processing methods of co-extrusion, extrusion and injection-molding.

EP 1348735 describes acrylic block copolymers useful as impact modifiers for thermoplastics. The impact-modified acrylic is described for the thermoforming of pipes, sheets films and fibrous products.

Tough, impact-modified acrylic films or coatings are often used to cover and protect other plastic materials, to take advantage of the excellent acrylic properties.

Some applications of tough, impact-modified acrylic films or coatings also require high levels of cleanliness and no optical defects caused by foreign particles or gels. Processing acrylic materials by common melt mixing extrusion, injection molding, compression molding, or calendaring, such as described in the art, usually results in the presence of a certain level of defects, such as dust, and local gels. For the finest filtration, polymer solutions are preferred because of the lower viscosities that are accessible relative to polymer melts. There is a need for an impact-resistant acrylic film or coating having a high optical purity.

Surprisingly it was found that solvent-based block copolymer compositions can be used to form toughened films and coatings in solvent-casting and solvent-coating processes. Preferably the films and coatings are acrylic. The solvent-based block copolymer can be filtered to remove particles above a set diameter anywhere from below 1 to above 50 microns, and then used to produce high optical purity films and coatings. The high optical purity films and coatings can be used wherever low defect films and coatings are required or desired. An additional advantage of solvent-based films and coatings is that tighter thickness control is possible, leading to films and coatings having less thickness variation than those made by current melt processes.

It was found that the block copolymer-based materials allow for excellent transparency of the materials under several conditions. Their transparency is maintained under mechanical stress as opposed to materials based on core-shell modifiers. Also, thermoformed parts do not form a haze due to impact modifiers moving to the surface as the part thins during processing.

The current art has not described the use of acrylic block copolymers for preparing solution coatings or solvent-casted films having a favorable balance of properties, including, toughness, use temperature and transparency under stress and through processing. Solvent-casting or solvent-coating can provide very high quality films and coatings as a result of the fine filtration of the solution prior to film formation, compared to other film-forming methods.

SUMMARY OF THE INVENTION

The present invention relates to a high optical purity toughened copolymer film and coating comprising a block or graft copolymer having hard and soft blocks, wherein said films and coatings contain less than 0.5 visible defects per square foot.

The invention further relates to a process for forming a toughened acrylic copolymer-based film or coating comprising the steps of:
a) forming a block or graft copolymer by a controlled radical polymerization, having hard and soft blocks;
b) forming a stable polymer/solvent admixture of said block or graft copolymer in a solvent;
c) optionally filering said polymer/solvent admixture;
d) coating said polymer/solvent admixture onto a substrate;
e) evaporating said solvent to form a film or coating.

DETAILED DESCRIPTION OF THE INVENTION

The invention relates to the use of block or graft copolymers, obtained by controlled radical polymerization, in a solvent-casting or solvent-coating process to obtain high-optical purity films or coatings.

By "block copolymer" as used herein means both true block polymers, which could be di-blocks, tri-blocks, or multiblocks; branched block copolymers, also known as linear star polymers; and gradient polymers. Gradient polymers are linear polymers whom composition changes gradually along the polymer chains, potentially ranging from a random to a block-like structure. Each block of the block copolymers may itself be a homopolymer, a random copolymer, a random terpolymer or a gradient polymer.

The term "polymer" as used herein is used to encompass homopolymers, copolymers, terpolymers and polymer formed of more than three monomers.

The block copolymer consists of at least one "hard" block, and at least one "soft" block. The hard blocks generally have a glass transition temperature (Tg) of greater than 20° C., and more preferably greater than 50° C. The hard block can be chosen from any thermopolymer meeting the Tg requirements. Preferably, the hard block is composed primarily of methacrylate ester units, styrenic units, or a mixture thereof. Methacrylate esters useful in the invention include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cycloheyl methacrylate, 2-ethylhexyl methacrylate, pentadecyl methacrylate, dodecyl methacrylate, isobornyl methacrylate, phenyl methacrylate, benzyl methacrylate, phnoxyethyl methacrylate, 2-hydroxyethyl methacrylate and 2-methoxyethyl methacrylate. Styrenics units include styrene, and derivatives thereof such as, but not limited to, alpha-methyl styrene, and para methyl styrene. Preferably the hard block contains at least 60 percent by weight, and preferably at least 80 percent by weight of methyl methacrylate units, with the remainder being alkyl acrylate units. The choice of copolymer type and amount can be selected to provide specific performance properties for a given end-use.

The soft blocks generally have a Tg of less than 20° C., and preferably less than 0° C. Preferred soft blocks include polymers and copolymers of alkyl acrylates, dienes, styrenics, and mixtures thereof. Preferably the soft block is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phnoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful dienes include, but are not limited to isoprene and butadiene.

In one preferred embodiment, the block copolymer is made of methylmethacrylate and butyl acrylate blocks. The butyl acrylate level in the block copolymer can be fine-tuned to give good scratch resistance.

The block copolymers of the present invention have a controlled molecular weight and molecular weight distribution. Preferably the molecular weight of the copolymer is from 1,000 to 1,000,000 g/mol, and most preferably from 5,000 to 300,000 g/mol. The molecular weight distribution, as measured by $M_w/M_n$ or polydispersity is generally less than 4.0, and preferably below 3.0.

The ratio of the hard to soft blocks in the copolymer is from 5:95 to 95:5. Preferably the ratio is 40:60 to 90:10, and more preferably the ratio is from 65:35 to 85:15.

In principle, any living or controlled polymerization technique can be utilized to make the block copolymer. However, for the practicality of controlling acrylics, the block copolymers of the present invention are preferably formed by controlled radical polymerization (CRP). These processes generally combine a typical free-radical initiator with a compound to control the polymerization process and produce polymers of a specific composition, and having a controlled molecular weight and narrow molecular weight range. These free-radical initiators used may be those known in the art, including, but not limited to peroxy compounds, peroxides, hydroperoxides and azo compounds which decompose thermally to provide free radicals. In one embodiment the initiator may also contain the control agent.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

One preferred method of controlled radical polymerization is nitroxide-mediated CRP. Nitroxide-mediated polymerization can occur in bulk, solvent, and aqueous polymerization, can be used in existing equipment at reaction times and temperature similar to other free radical polymerizations. One advantage of nitroxide-mediated CRP is that the nitroxide is generally innocuous and can remain in the reaction mix, while other CRP techniques require the removal of the control compounds from the final polymer.

The mechanism for this control may be represented diagrammatically as below:

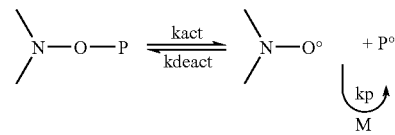

with M representing a polymerizable monomer and P representing the growing polymer chain.

The key to the control is associated with the constants $K_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ is too high or when the ratio $k_{deact}/k_{act}$ is too low though, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

The nitroxide-mediated CRP process is described in, U.S. Pat. No. 6,255,448, U.S. 2002/0040117 and WO 00/71501, incorporated herein by reference. The above-stated patents describe the nitroxide-mediated polymerization by a variety of processes. Each of these processes can be used to synthesize polymers described in the present invention.

In one process the free radical polymerization or copolymerization is carried-out under the usual conditions for the monomer or monomers under consideration, as known to those skilled in the art, with the difference being that a β-substituted stable free radical is added to the mixture. Depending on the monomer or monomers which it is desired to polymerize, it may be necessary to introduce a traditional free radical initiator into the polymerization mixture as will be evident to those skilled in the art.

Another process describes the polymerization of the monomer or monomers under consideration using a alkoxyamine obtained from β-substituted nitroxides of formula (I) wherein A represents a mono- or polyvalent structure and $R_L$ represents a mole weight of more than 15 and is a monovalent radical, and $n \geq 1$.

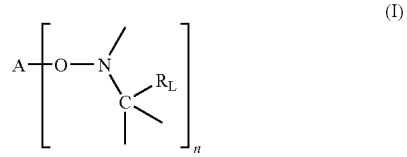

(I)

Another process describes the formation of polyvalent alkoxyamines of formula (I), based on the reaction of multifunctional monomers, such as, but not limited to, acrylate monomers and alkoxyamines at controlled temperatures. The multifunctional alkoxyamines of formula (I), wherein $n \geq 2$, may then be utilized to synthesize linear star and branched polymeric and copolymeric materials from the monomer or monomers under consideration.

Another process describes the preparation of multimodal polymers where at least one of the monomers under consideration is subjected to free radical polymerization in the presence of several alkoxyamines comprising the sequence of formula (I), wherein n is a non-zero integer and the alkoxyamines exhibit different values of n.

The alkoxyamines and nitroxyls (which nitroxyls may also be prepared by known methods separately from the corresponding alkoxyamine) as described above are well known in the art. Their synthesis is described for example in U.S. Pat. No. 6,255,448 and WO 00/40526.

The block copolymer of the invention has an elastomeric piece built into the acrylic backbone, and can be used by itself or can be blended as an impact modifier into a thermoplastic composition. In one embodiment the thermoplastic will serve as a matrix for the block copolymer. The impact modified thermoplastic will contain from 5-95 weight percent, and preferably 20 to 80 weight percent of said block copolymer and from 5-95 weight percent and preferably 20 to 80 weight percent of said matrix polymer. Both the matrix and the block copolymer can be put into solution and be filtered to produce a high optical purity polymer (blend) solution. Useful thermoplastic matrices include, but are not limited to, polycarbonate, acrylic polymers, polystyrene (PS), high impact polystyrene (HIPS), polyvinyl chloride (PVC), polyvinylidene fluoride (PVDF), PVDF-acrylic copolymers, imidized acrylic polymers, cyclic olefin copolymers (COC), polyolefins, impact modified polyolefins, polyesters (such as PET, PBT, APET), styrene acrylonitrile (SAN), acrylonitrile-acrylate copolymers, acrylonitrile-methyl methacrylate copolymer, methyl methacrylate-styrene copolymer, other styrenic polymers or copolymers containing alpha-methyl styrene, polyethylene terephthalate-glycol modified (PETG), methacrylate-butadiene-styrene terpolymer, acrylonitrile-styrene-acrylate (ASA) terpolymer, acrylonitrile butadiene styrene (ABS) terpolymer, polycyclo-hexylethylene, and blends thereof. A preferred matrix that is a homo- or co-polymer of methyl methacrylate.

By solvent-casting or solvent-coating as used herein means a process in which a polymer is dissolved, dispersed, or otherwise admixed in an organic or aqueous solvent to form a solution or dispersion. The terms "solution" and "polymer solution" will be used herein to describe the polymer/solvent mixture, which may be in the form of a stable solution, dispersion, suspension, emulsion, inverse emulsion or other stable form. The formed solution is then applied to a substrate and the solvent is removed to generate a film or coating. Useful solvents include, but are not limited to, water, alkanes, aromatics, ketones, esters, ethers, acids, amines, alcohols, dimethylformamide, halogen derivatives, as well as any mixture of these solvents.

In addition to the block copolymer, other additives typically used in thermoplastics may also be present, including pigments, dyes, plasticizers, antioxidants, heat stabilizers, UV stabilizers, processing additives or lubricants. In one embodiment a clear formulation is desired, and would be free of pigment. While the additives could be of any size for use in the polymer solution, it will be recognized that if the polymer solution is to be subjected to filtration prior to use, that the additives would need to be small enough to avoid being filtered out of the solution. One advantage of adding additives to the solutions of the present invention is that the viscosity is far lower than would be present in a melt-blending operation. This allows for an easier, faster and more thorough mixing process which enables a much higher additive concentration in the lower-shear blending, for instance a high-filler composition.

The block copolymer of the invention is especially useful in high-optical purity applications. A solution of the acrylic block copolymer, or of the block copolymer blended in a thermopolymer matrix, can be filtered, resulting in a very pure solution that can be casted onto a substrate or applied as a solvent coating in order to prepare a transparent ("zero defect") film or coating.

The block copolymer also provides a means to produce a toughened acrylic film or coating, since the block copolymer is not filtered out of the solution.

Filtration can occur by means known in the art, such as, for example, membrane filtration and the use of gradient filter cartridges. Filtration of the polymer solution can be used to remove particles of any size, depending on the end-use requirements. Filtration media can be selected, for instance to remove particles larger than 50 microns, particles larger than 30 microns, particles larger than 5 microns, particles larger than 1 micron, or any other desired purity. The filtered polymer solution will contain the block copolymer, as well as the linear polymer when a thermoplastic is impact modified by the block copolymer.

Solvent-casting produces a film with a total thickness of between 2 and 200 micrometers, and preferably 10 to 120 micrometers. A film is casted onto a smooth substrate surface, such as a polyester film (PET), or a polished metal such as aluminum. The substrate is selected so it will not be degraded by the solvent. In one embodiment, the film has a haze below 2. In another embodiment, and acrylic film can have an elongation at break greater than 50%. A solvent-casting process provides excellent thickness control, producing a film of 100 microns±5 microns or even ±3 microns—a control that is not possible from a melt process. The film can be casted on a substrate from which it can be easily used and processed as a film, or it can be coated onto a substrate for the purpose of providing a permanent smooth top-layer that due to filtration can be of very high optical purity and low defects. Substrates to which the thin permanent tough film of the invention can be usefully applied include acrylic substrates, PVC, polycarbonate, glass, metals, wood, ceramics, leather, wood/polymer composites, as well as other plastics and composites.

The block copolymer (or block copolymer/thermoplastic blend) solution can be applied to a substrate using a solvent-casting or coating process including brushing, rollers, spray, inkjet, slot die, gravure, reverse roller, and dipping.

Currently there are no high optical purity acrylic impact-modified coatings, and the composition and process of the invention provides a means to produce such a coating, since the impact modifier is not filtered out of the solution. Substrates that can be coated with the toughened acrylic—either in a filtered high optical purity form, or in an unfiltered form—include, but are not limited to, solvent-coated vinyl tarps, canvas, glass—providing scratch resistance and optical clarity, flexible PVC (especially where the block copolymer solvent coating solution contains UV adsorber), and metals. In one embodiment the coating is used for biological applications such as cassettes for kidneys.

The toughened films or coatings of the invention have a high optical purity, producing a transparent film or coating that is defect-free. By "defect free", "particulate-free", or "zero defect" as used herein means the film or coating has less than 0.5 visible defects per square foot, and preferably less than 0.01 defects per square foot. A visible "defect", as used herein, describes any defect having a diameter of greater than one-half of the (dried) film thickness, and having a maximum diameter less than what can be detected by the naked eye. In general, the naked eye can see a defect of from 20-30 microns. The visible defect is caused by any particle, plus a certain area around a particle in which the film or coating is irregular due to the effect of the particle. In other applications requiring very pure optical properties (low scattering of light and low distortion) the limit may be even less.

Optical purity can be seen in both transparent (non-pigmented) and pigmented applications. For example, in a high gloss black film, spots or defects can be seen under certain lighting conditions for comparative films that do not have the high optical purity of the present invention. Another example of optical purity is found as the film or coating of the invention is further processed—for example a film of the invention laminated onto a substrate then further thermoformed—and the thermoformed part will not form a haze due to impact modifiers moving to the surface as the film thins during thermoforming, as would be expected from a core-shell modified film or coating.

Films and coatings of the invention are particulate-free, tough, have low thickness variation, and have good optical properties.

The films or coatings formed by solvent-casting or solvent-coating have a thickness controlled to a much closer tolerance than can be obtained by extrusion or blown film heat-processed methods. This control is advantageous in some applications where great optical clarity with little incident light distortion is necessary.

The films and coatings of the invention can be used for the production of optical grade products (low scattering) for which transparency is maintained under mechanical stress and a wide temperature range.

One such optical application is for DVD production. A tough, scratch-resistant transparent acrylic film can be formed or applied on the DVD which both protects the DVD and acts as a lens or focusing layer, which is especially good for small wavelength laser applications.

The toughened film of the invention can also be used as a capping agent of high optical purity providing scratch and impact resistance without effecting the substrate properties.

Other proposed uses for the block-copolymer film or coating include, but are not limited to, insert molding, films for use as an outer layer in a flat panel display or LED, membranes switches, decals or transfer films, instrument panels, and smart cards. In one embodiment graphic designs could be printed onto the toughened film of the invention, and applied to a substrate. The film can be applied to a substrate by lamination or the use of an adhesive.

EXAMPLE 1

A block copolymer (Polymer A) made of polybutyl acrylate and polymethyl methacrylate was synthesized in the bulk by controlled radical polymerization in the presence of an alkoxyamine based on the nitroxide SG1, and was isolated in pellets by extrusion. As a result of the manufacturing process, a small fraction of the material is composed of insoluble particles or contaminants.

Sample 1 was prepared using the following steps. A solution of Polymer A in a mixture of methyl ethyl ketone (MEK) and 2-methyl pentanone (MIBK) was filtered through a 1-micron cartridge filter prior to being casted on a polyester substrate. The wet film was dried by passing the casted substrate through a multi-zone oven with temperatures and residence times suitable for the specific solvent system. The dry film was peeled from the polyester substrate to obtain a free-standing film with an average thickness of 95 microns±4 microns.

Sample 2 (comparative) was prepared by the following steps. First, Polymer A was melt extruded with a 400-mesh screen filter. Next, the polymer resin was converted to a film by extrusion-casting onto a chrome roll using typical processing conditions for acrylic thermoplastic polymers. Final thickness of the extruded film was 80 microns±10 microns.

For analysis of defects greater than 10 microns but less than 30 microns in size, Sample 1 and Sample 2 were placed flat on a microscope stage and analyzed for defects by optical microscopy using phase contrast. Five regions of each film sample were evaluated for the number of particulates of a given size. From the known area of the five regions, an average defect density (number of defects per area) was calculated for each film. The five regions were chosen at random. For analysis of defects larger than 30 microns, the film samples were inspected visually over larger areas. Microscopy and image analysis software were used to confirm the defect sizes. The data in Table 1 demonstrate the cleanliness of the solvent-casted film, Sample 1.

TABLE 1

|  | Defect Density (10 to 30 microns in size) defects/square millimeter | Defect Density (>30 microns in size) defects/square foot |
|---|---|---|
| Sample 1 | 5 | 0 |
| Sample 2 (comparative) | 32 | 50 |

What is claimed is:

1. A high optical purity toughened solvent-cast or solvent-coated copolymer film or coating comprising a block or graft copolymer having hard and soft blocks, wherein said film or coating contains no particle greater than 30 microns, and wherein said copolymer film or coating contains no core-shell particles, wherein said film or coating is formed from a stable admixture comprising said copolymer and a solvent that has been filtered through a filter of 30 microns or less, and wherein said film or coating has a variation of thickness of no more than 5% of the film thickness.

2. The high optical purity film or coating of claim 1 wherein said hard block comprises primarily methylmethacrylate units and said soft block comprises primarily alkyl acrylate units.

3. The high optical purity film or coating of claim 1 consisting of the block or graft copolymer.

4. The high optical purity film or coating of claim 1 comprising from 5 to 95 weight percent of said block or graft copolymer and from 5 to 95 percent by weight of a thermoplastic matrix polymer.

5. The high optical purity film or coating of claim 1 wherein said hard block has a Tg of greater than 20° C., and said low Tg block has a Tg of less than 20° C.

6. The high optical purity film or coating of claim 1 wherein said block or graft copolymer has a weight average molecular weight of from 1,000 to 1,000,000 g/mol.

7. The high optical purity film or coating of claim 1 wherein said block or graft copolymer is formed by controlled radical polymerization.

8. The high optical purity film or coating of claim 1 wherein said block or graft copolymer is formed by nitroxide-mediated controlled radical polymerization.

9. The high optical purity film or coating of claim 1 wherein said film or coating further comprises one or more additives selected from the group consisting of pigments, dyes, plasticizers, antioxidants, heat stabilizers, UV stabilizers, processing additives, lubricants and impact modifiers.

10. The high optical purity film or coating of claim 1 wherein said film or coating retains its original optical properties under mechanical stress and during thermo-processing.

11. The high optical purity film or coating of claim 1, wherein said hard block has a Tg of greater than 50° C., and said low Tg block has a Tg of less than 0° C., wherein said film or coating contains no particle greater than 5 microns, and wherein said film or coating is acrylic.

* * * * *